(12) United States Patent (10) Patent No.: US 8,388,146 B2
Goran (45) Date of Patent: Mar. 5, 2013

(54) ANAMORPHIC PROJECTION DEVICE

(75) Inventor: Charles Goran, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 220 days.

(21) Appl. No.: 12/848,201

(22) Filed: Aug. 1, 2010

(65) Prior Publication Data

US 2012/0026376 A1 Feb. 2, 2012

(51) Int. Cl.
*G03B 21/14* (2006.01)

(52) U.S. Cl. ............. 353/69; 353/28; 353/70; 353/119; 353/121; 353/122; 359/456; 348/53

(58) Field of Classification Search .................. 353/7–8, 353/28, 69, 70, 119, 122; 348/53, 51, E13.039, 348/E13.041, E13.044; 359/443, 448, 453, 359/454, 455, 456, 457, 458, 452, 462, 471; 349/5, 7, 8, 9, 117
See application file for complete search history.

(56) References Cited

U.S. PATENT DOCUMENTS

| | | | |
|---|---|---|---|
| 4,922,336 A * | 5/1990 | Morton ............................ | 348/51 |
| 6,128,132 A * | 10/2000 | Wieland et al. ............... | 359/463 |
| 7,070,283 B2 * | 7/2006 | Akutsu ........................... | 353/69 |
| 2006/0256298 A1 * | 11/2006 | Knipe .............................. | 353/69 |
| 2008/0013053 A1 * | 1/2008 | Anson ............................. | 353/69 |
| 2009/0079945 A1 * | 3/2009 | Klosowiak et al. ............. | 353/69 |
| 2011/0025829 A1 * | 2/2011 | McNamer et al. .............. | 348/50 |
| 2011/0292347 A1 * | 12/2011 | Zhang et al. .................... | 353/28 |

* cited by examiner

*Primary Examiner* — Georgia Y Epps
*Assistant Examiner* — Sultan Chowdhury
(74) *Attorney, Agent, or Firm* — Hart IP Law & Strategies

(57) ABSTRACT

An anamorphic projection device is described. In one aspect, the device includes at least one camera and a projector such as a pico projector. The device receives information from the camera to sense position and orientation of a projection surface independent of the device. Based on this received information, the device renders an anamorphic image for perspective viewing on the sensed projection surface. In one implementation, the device receives the image wirelessly, for example, from a website. In one aspect, the device includes a user interface or UI. The UI allows a device user to navigate a projected image (e.g., use a cursor control or other means to navigate a webpage), present/download a new projected image, lock a projected image to a coordinate space on the projection surface to reduce or eliminate movement of the projected image responsive to user or device movement, etc.

19 Claims, 8 Drawing Sheets

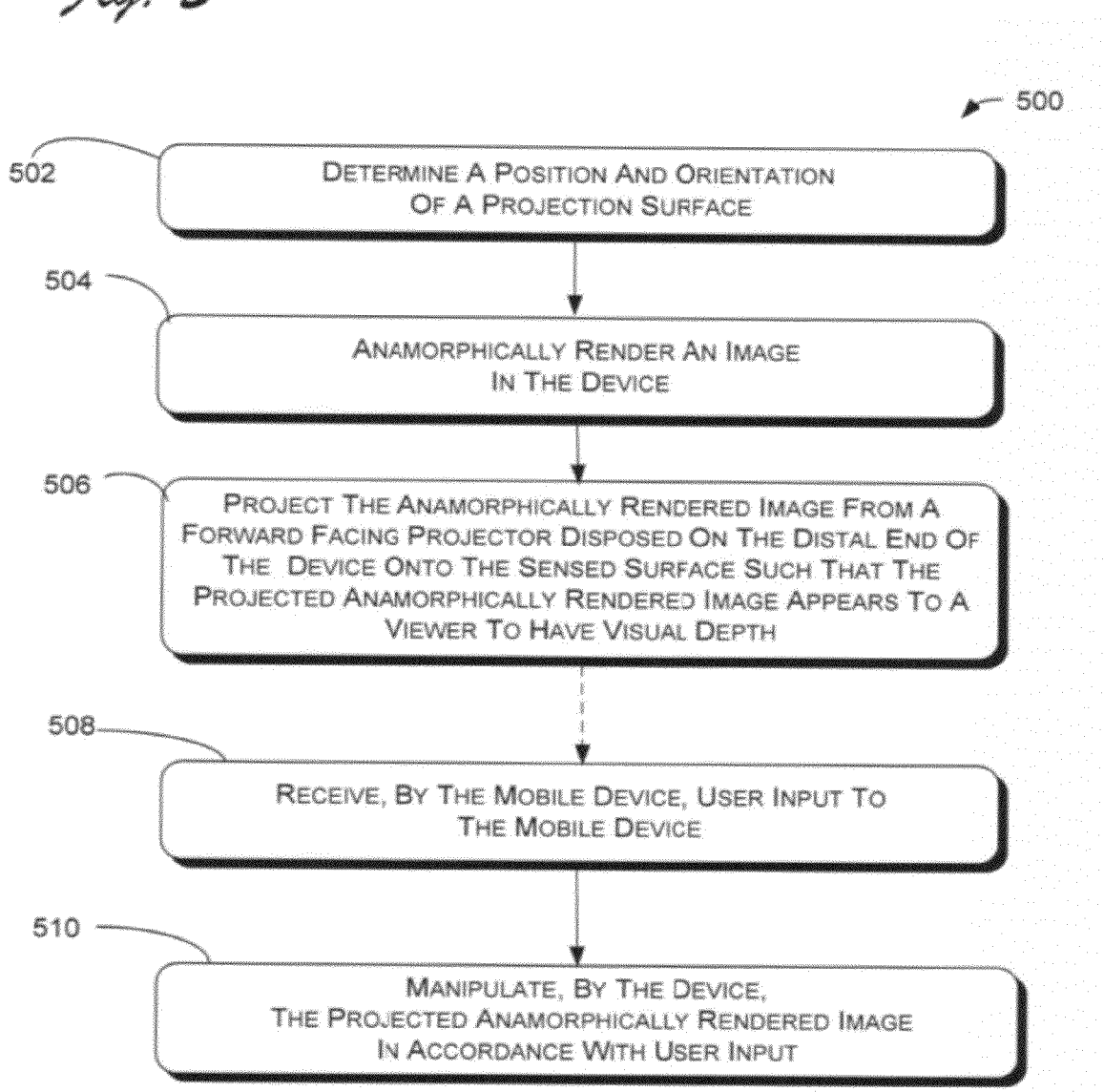

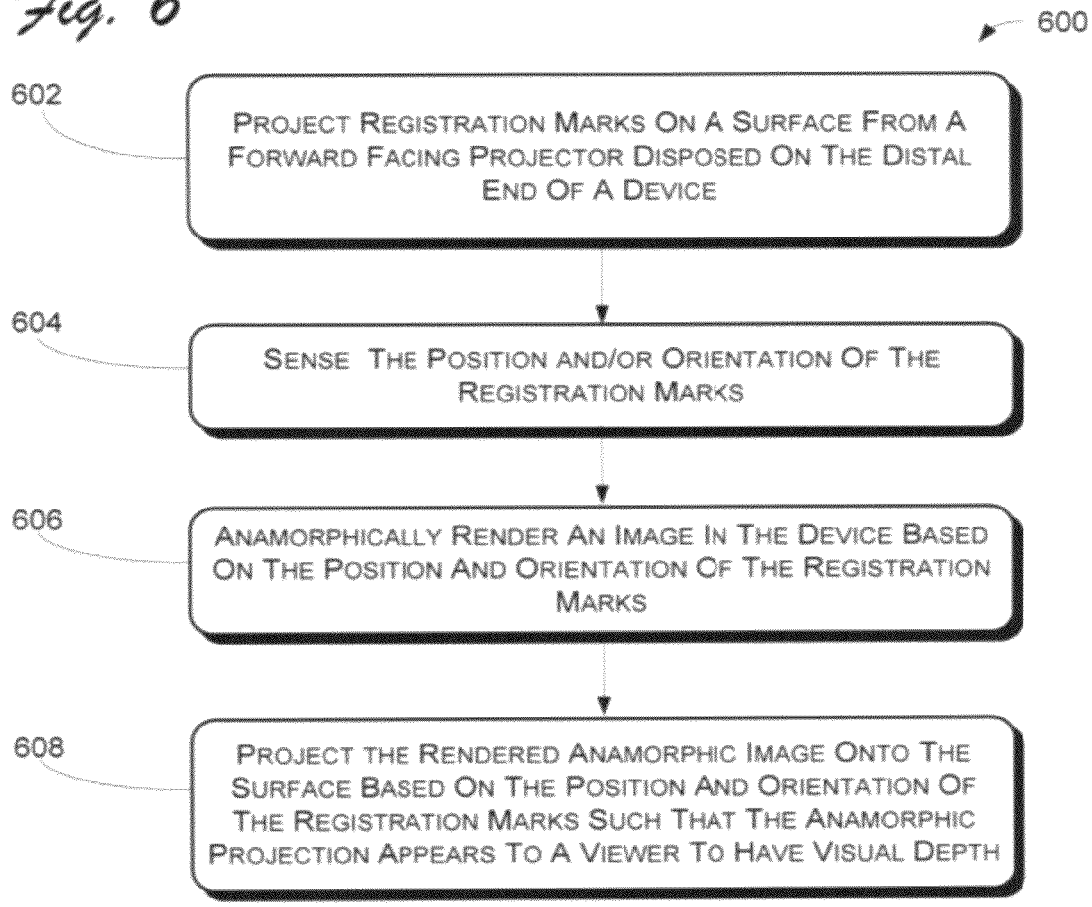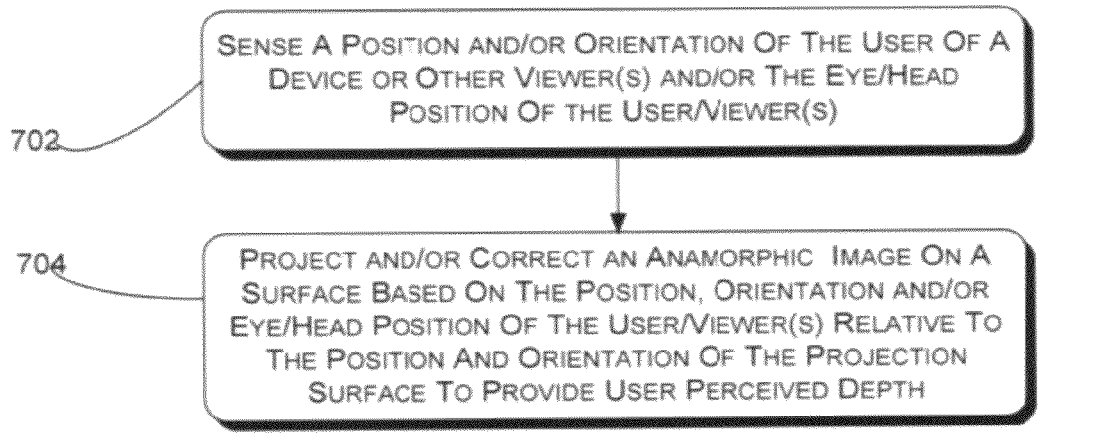

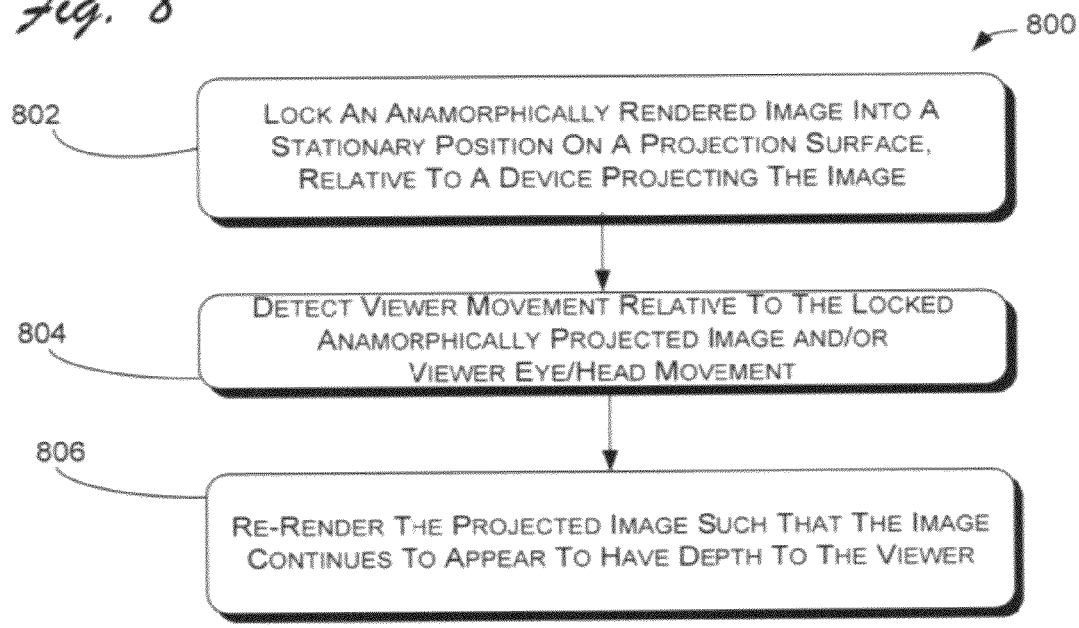
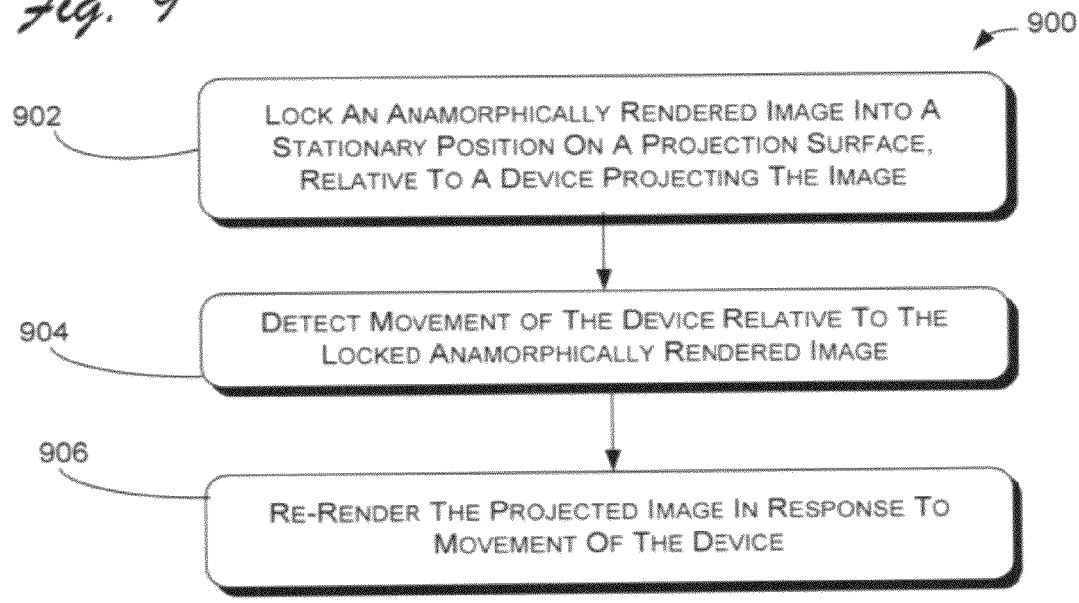

ANAMORPHIC PROJECTION DEVICE

BACKGROUND

Typical projection or display of an image, video, or the like appearing to have dimensional depth, e.g., a three-dimensional or 3-D projection or display, has generally required a user to wear eyewear to perceive the 3-D image effect. Such eyewear can be confining. Moreover, equipment typically required to project or display images adapted for 3-D viewing may be bulky.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIG. 2b shows the exemplary device projecting the anamorphic projection on the surface, viewed generally from a perspective other than that of a user or other intended viewer (e.g., adjacent or otherwise to the user), according to the embodiment of FIG. 2a.

FIG. 3 shows computing device components of the device of FIG. 1a, FIG. 1b, FIG. 2a, and FIG. 2b.

FIG. 5 shows an example procedure to render and project an anamorphic image according to one embodiment. In one aspect, the exemplary procedure provides for user interaction with user interface aspects of a presented anamorphic image, according to one embodiment.

FIG. 6 shows an exemplary procedure to project an anamorphic image based on position and orientation of projected registration marks, according to one embodiment.

FIG. 7 shows an exemplary procedure to project an anamorphic image on a projection surface based on sensed positioned and/or orientation of a user of the projecting device or other viewer, according to one embodiment.

FIG. 8 shows an exemplary procedure to project and interact with an anamorphic image, wherein the image is modified responsive to viewer position, according to one embodiment.

FIG. 9 shows an exemplary procedure to render and project an anamorphic image, wherein the anamorphic image is modified responsive to movement of a projecting device, according to one embodiment.

DETAILED DESCRIPTION

Overview

Figure 1A:
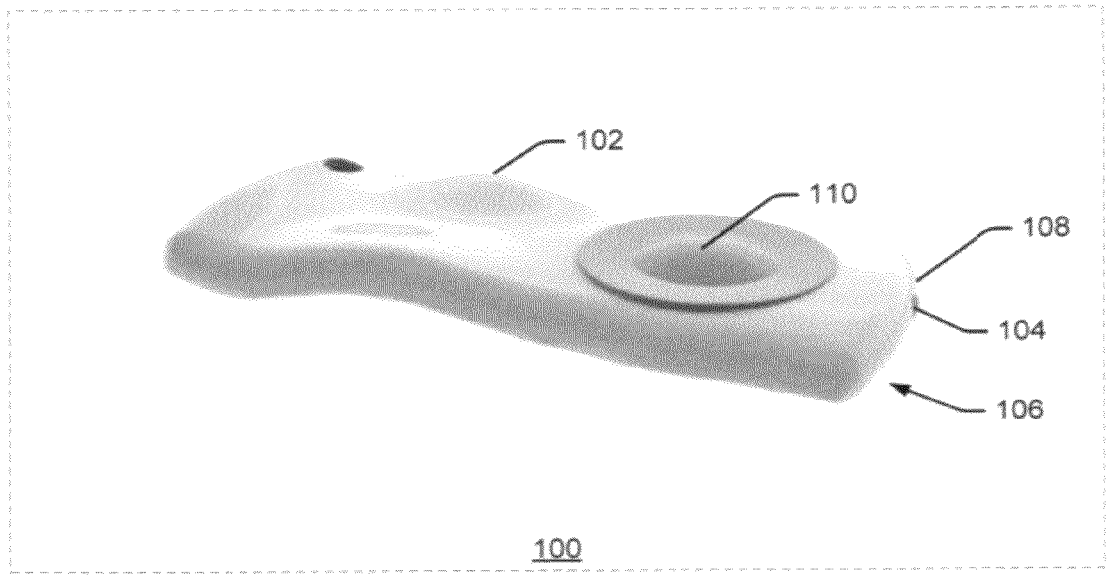
FIG. 1a shows aspects of an exemplary device for presenting an anamorphic projection to a user or viewer, according to one embodiment.

The described systems and methods are directed to a device that projects anamorphic perspective (optically distorted) images that appear to have visual depth to a user of the device or other viewer, without the use of special eyewear or other additional apparatus. More specifically, the device allows a user to acquire, project, and navigate anamorphic perspective images such as a photograph or a webpage of a website on a remote projection surface that is independent of the device. In accordance with various embodiments, the device may be a mobile handheld displayless device. Such embodiments of the device may be "displayless" in that the device itself does not have a screen, nor is it connected to a monitor or the like. The device may be "handheld" in that it is readily portable. That is, the device may be capable of being held and manipulated in one hand of a user, may be wearable, or otherwise sized for personal use.

In accordance with various implementations, the device comprises a processor operatively coupled to memory, input components, and output components. The memory includes computer-readable instructions executable by the processor to provide the device with, for example, spatial responsiveness, image stabilization, network connectivity, image processing, user interface control, browser features, and/or the like. The input components may include a first input camera disposed in a distal end of the device, a second input camera disposed in a proximal end of the device, and a haptic interface to receive user inputs. Output components may include, for example, a projector, such as a pico projector, and a speaker.

In one implementation, the input camera on the distal end of the device may provide the device with input to gather information about the surface onto which the device is projecting, or is to project, an image. This information may in turn be used by the processor to determine spatial orientation of the device relative to a projection surface. Such data might be gathered by projecting an image including a set of registration marks that represent a rectangle, square or other desired image outline shape on the projection surface using the pico projector. The processor may then use image processing analysis to identify and track the registration marks to determine perspective of the projection surface in a two-dimensional plane, despite movement of the device relative to the projection surface. Using this surface perspective information, the device, in accordance with various embodiments, renders an image using perspective anamorphosis, and projects the anamorphically-rendered image on the projection surface. The resulting projection onto the surface presents an image that appears to have visual depth to the user of the device or other viewer(s). Since the three-dimensional image is an optical illusion, others nearby would likely see a distorted image. The input camera on the distal end of the device might also provide the device with feedback with respect to user navigation of a projected image (e.g., a webpage, photo album, menu, or the like).

In accordance with various implementations, as the viewer moves, or as the viewer reorients the device, with respect to the projection surface, the device will automatically recalculate the angle of the projection surface to re-render and project the anamorphic perspective image. An additional input camera on the proximal end of the device might provide the device with input pertaining to the viewer (e.g., for determining identity, head/eye position relative to the device, etc.). In accordance with some embodiments, the device may use the proximal camera on the rear of the device to provide data to the processor concerning the viewer's head/eye position relative to the projection surface and the device, particularly the pico projector of the device and the pico projectors alignment with the projection surface. This information may be used by the device to render and project an accurate anamorphic perspective image for the viewer. Further, head/eye movement may also be tracked and used by the processor to continue rendering and projecting an accurate anamorphic perspective image for the viewer, as the viewer, and/or the device moves.

An Exemplary Device

FIG. 1a shows aspects of an exemplary device 100 for presenting an anamorphic projection to a viewer, according to one embodiment. As illustrated, a generally parallelepiped housing 102 of device 100 may be sized and ergonomically adapted for handheld and/or wearable use. Device 100 includes image projector 104 disposed in distal end 106 of device 100. Projector 104 may be any suitable projector, sized for use in the present device, e.g., a pico projector, Micro-Electro-Mechanical Systems (MEMS)-based projector, or the like. End 106 is generally distal relative to the user during normal use of device 100. Device 100 further includes a forward facing camera 108 disposed with respect to the distal end of the device. In one implementation, for example, camera 108 is an Active Pixel Sensor (APS), Charge Coupled Device (CCD), or the like. The forward facing camera 108 may provide the device with input to gather information about the surface onto which the device is projecting, or is to project, an image, such as surface position and orientation. This information may in turn be used by the device to render the anamorphic projection using perspective anamorphosis and/or to provide the user with visual feedback for navigation of the projected image.

Other embodiments of device 100 may sense the position and/or orientation of a projection surface employing any number of methods, such as electromagnetic tracking, acoustic tracking, other optical tracking methodologies, mechanical tracking, or the like. Such tracking methodologies may employ electromagnetic signals, acoustic signals, optical signals, mechanical signals, or the like, respectively. More particularly, embodiments employing optical signals might emit an infrared signal using projector 104 onto projection surface and sense the reflected infrared light using camera 108 to determine the relative distance and/or orientation of the projection surface. Acoustic methodologies might employ ultrasonic sound waves emitted from the device. The delay in their reflection may be measured and/or the reflected sound wave analyzed to determine the distance to the projection surface and/or its relative orientation. Alternatively, a passive methodology may be used to determine projection surface distance and/or orientation, such as by performing a passive analysis of an image of the projection surface (or a projected image) that is entering camera 108, using phase detection or contrast measurement. Phase detection may be achieved by dividing the incoming light into pairs of images and comparing them. Contrast measurement may be achieved by measuring contrast within the image, through the lens of camera 108. Further, the device may employ information about a position, or change in position of the user and/or other viewer(s) to modify the image to provide a proper viewing alignment of the projected image with respect to the device user and/or viewer(s).

In this implementation, device 100 includes user interface (UI) 110 (e.g., a haptic interface) such as the navigation directional control with section button (e.g., a directional pad) illustrated. However, UI 110 can take any number of other forms, such as a joystick, roller ball, or any other direction and selection control. UI 110 may be used for control of device 100 and/or navigation of a projected image, in addition to, or rather than, user movement of device 100. UI 110 is shown disposed atop device housing 102, but a human interface may be otherwise integrated into the device.

Figure 1B:
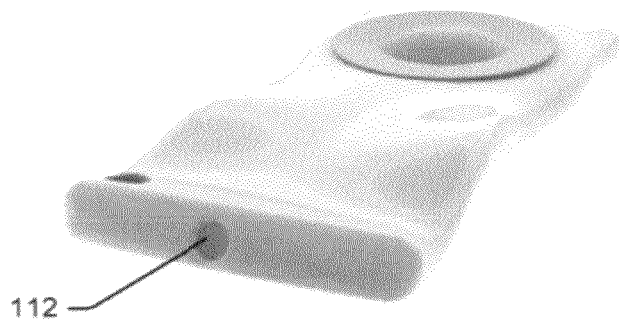
FIG. 1b shows further exemplary aspects of a device for presenting an anamorphic projection to a user or viewer, according to one embodiment.

FIG. 1b shows further exemplary aspects of a device 100 for presenting an anamorphic projection to a viewer, according to one embodiment. As shown, device 100 also includes a rearward facing camera 112 disposed with respect to the proximal end of the device. In one implementation, for example, camera 112 is an APS, CCD, or the like. This rearward facing camera at least provides the device with input pertaining to the user or other viewer(s). In one implementation, for example, the rearward facing camera provides the device with one or more types of information/characteristics to determine the viewer's image, identity, head/eye position relative to the device and/or the projection surface, and/or the like. Such data may be used to render the anamorphic projection and/or to provide other functionality to the device and/or value to a user of the device. For example, information from the rearward facing camera concerning the position of the viewer, such as the viewer's head and/or eye position or orientation, with respect to the device, may be used by the device when projecting anamorphically-rendered image 102 on projection surface or the viewer's image may be used for identity verification to restrict or control use of the device.

Figure 2A:
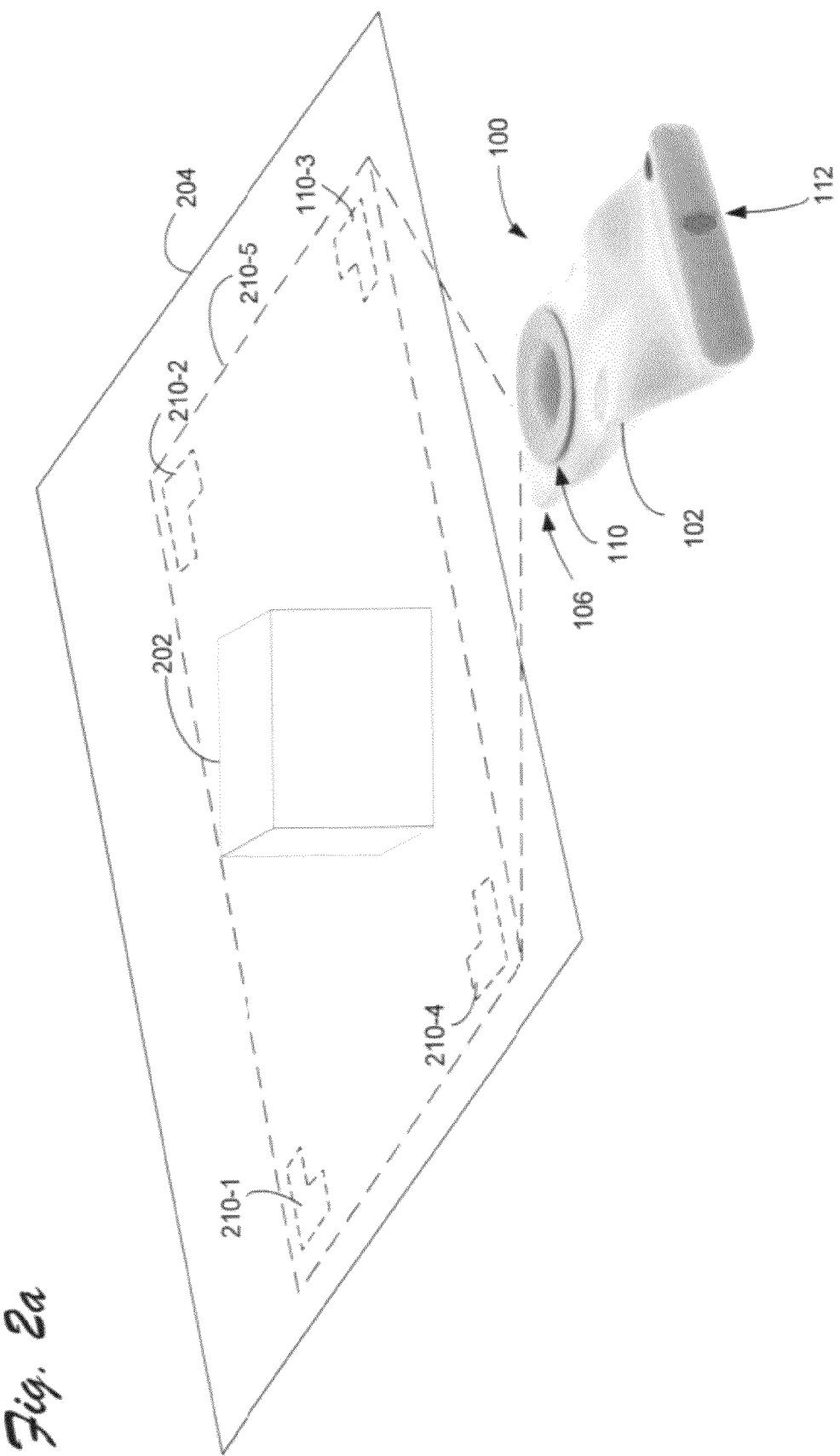
FIG. 2a shows an exemplary device projecting an anamorphic projection on a surface (e.g., a tabletop), viewed generally from the perspective of the user of the device, according to one embodiment.

FIG. 2a shows an exemplary device 100 projecting an anamorphically-rendered image 202, on a surface 204 (e.g., a tabletop, etc.), viewed generally from the perspective of the user of the device, according to one embodiment. In this example, anamorphic projection 202 is represented by a generally rectangular box. In one implementation, and to facilitate sensing a position and orientation of projection surface 204, device 100 may project a set of registration marks 210 (e.g., 210-1 through 210-4 and/or 210-5), or the like, onto the projection surface. Registration marks 210 may or may not be projected in a spectrum visible to a viewer, but are detectable by camera/sensor 108. Forward facing sensor/camera 108 (FIG. 1) is used by the device to sense the position and/or orientation of the registration marks. The projection of image 202 is anamorphically rendered by device 100, using perspective anamorphosis, based on the position and/or orientation of registration marks 210. Any number of other methods may be employed to determine the relative angle of the device to the projection surface (i.e., the distance and orientation of the projection surface). For example, gravity switched accelerometers, gyroscopic devices, or the like may be used to determine the pitch and yaw of the device.

The user may navigate anamorphic image 202 through movement of device 100 relative to the projection surface or through the use of haptic interface 110. In such a scenario, the device detects the device motion (e.g., left, right, up, down, diagonally, etc.) and maps that detected motion to corresponding user commands. Those user commands are then used as user input to the device, e.g., to navigate a projected image, and/or so on. In another example, device 100 may also project a cursor within image 202 to allow user selection of projected webpage links, a particular photo in a projected photo album, menu item, or the like, in image 202, which may facilitate display of a subsequent image(s).

FIG. 2a shows a single projected anamorphic image 202. However, in accordance with various embodiments a number of anamorphic images may be projected. While a single anamorphic image may be rendered and projected for viewing by the user of device 100 or for another viewer viewing from a perspective different from the user, multiple projected anamorphic images may be projected so that each of a number of viewers may perceive visual depth in at least one of the images from each of the viewers' perspectives.

Image 202 might, in accordance with various embodiments, be a menu for operation of the present device. For example, such a menu could provide options for rendering and/or display of an anamorphic image. Such a menu might include options such as rendering and displaying the anamorphic image for viewing from the user's perspective. Another option might be to render and display the image for viewing by a number of users. This option might result in a number of anamorphic images being rendered and displayed, each optimized from viewing from a different perspective, such as sensed perspectives of a number of viewers. Yet another option might call for rendering and projecting the image for viewing at a selected distance, while another option might be for providing the best rendering and projection for multiple viewers at a distance, such as for an audience (positioned behind the device user).

Figure 2B:
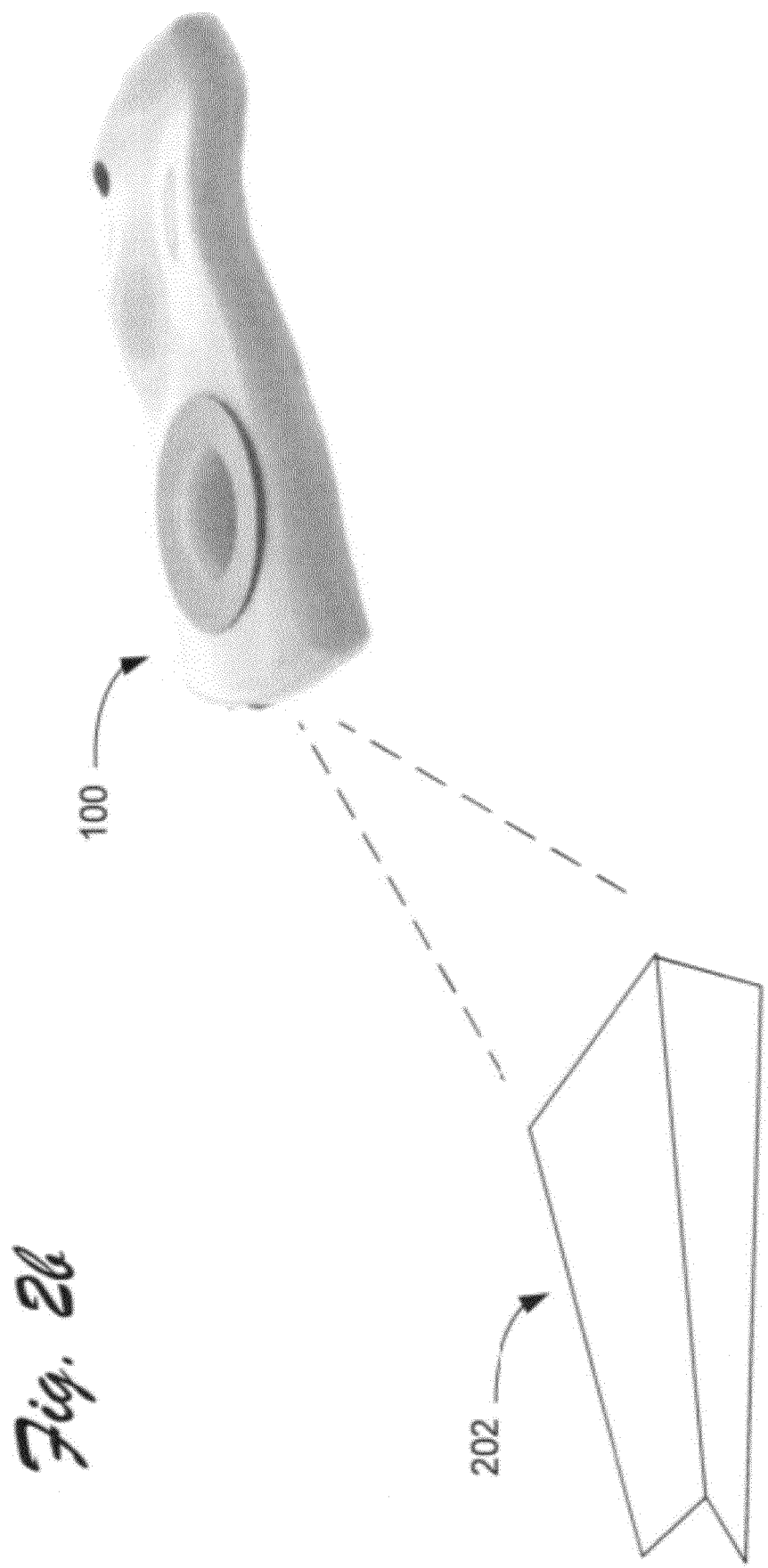

FIG. 2b shows exemplary device 101 projecting anamorphic projection 202 on surface 204, viewed generally from a perspective other than that of a user or other intended viewer, according to the embodiment of FIG. 2a. FIG. 2b shows the distortion of projection 202 on surface 204 when viewed from the side of device 100, rather than from the perspective of the user as in FIG. 2a.

Figure 3:
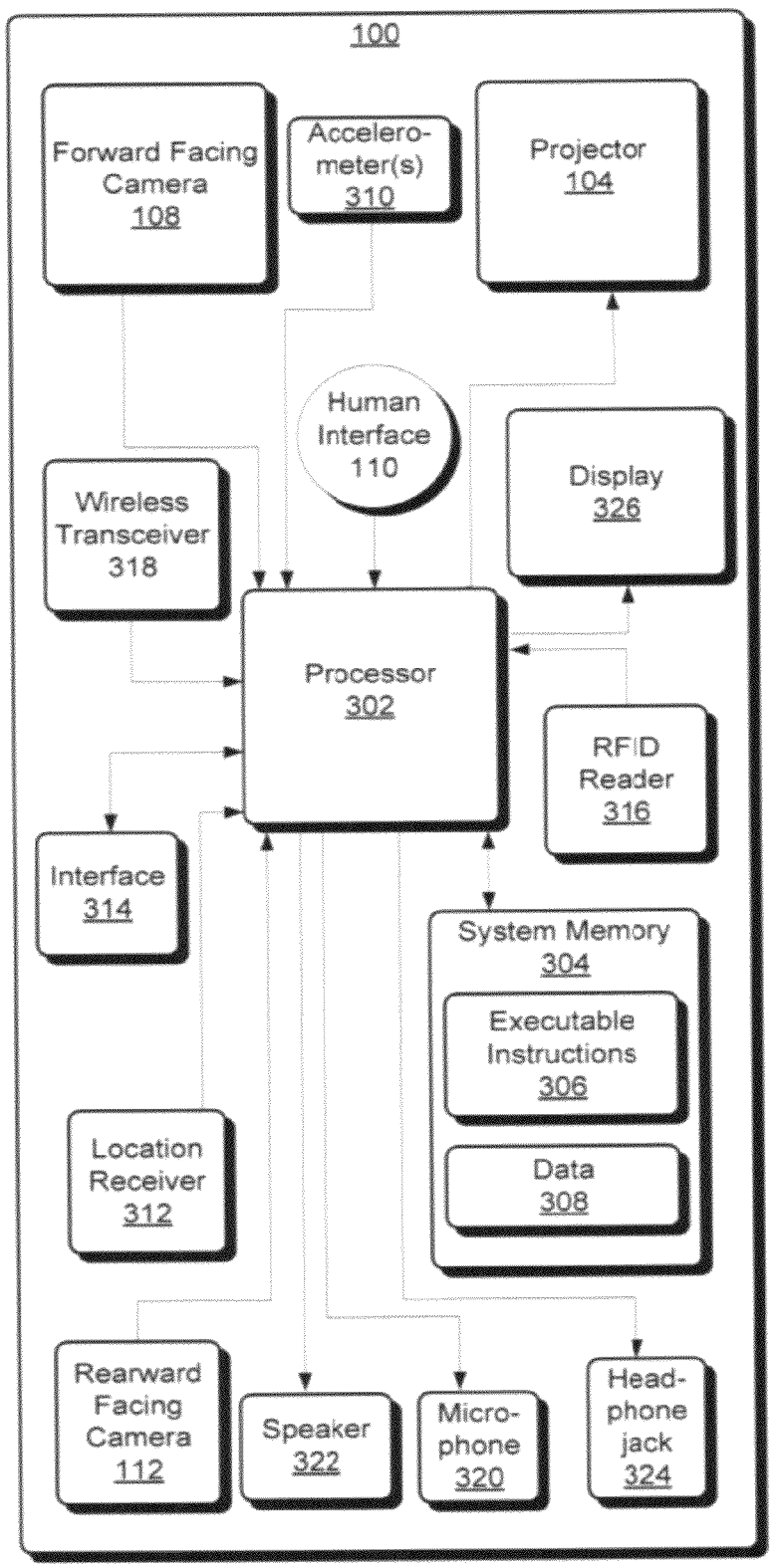
FIG. 3 diagrammatically illustrates a layout of components of a device with anamorphic projection capabilities, according to one embodiment. In particular.

FIG. 3 shows further exemplary aspects of an anamorphic projection device, according to one embodiment. In particular, FIG. 3 shows exemplary computing device components of the device 100 of FIGS. 1a, 1b, 2a, and 2b. Referring to FIG. 3, device 100 includes, for example, one or more processors 302 system memory 304 and cache memory (not shown). System memory 304 may include various computer-readable media, such as volatile memory (e.g., random access memory (RAM)) and/or nonvolatile memory (e.g., read-only memory (ROM)). Memory 304 may also include rewritable ROM, such as Flash memory and/or mass storage devices such as a hard disk. System memory 304 includes processor executable instructions (program modules) 306 to perform the operations to project an anamorphic projection on a surface independent of the device, in addition to program data 308.

As illustrated in FIG. 3, and as described above in reference to FIGS. 1a, 1b, 2a, and/or 2b, processor(s) 302 are also operatively coupled to projector 104, user interface 110, forward facing camera 108, and rearward facing camera 112. In one implementation, processor(s) 302 is also coupled to a projection surface position and orientation sensor, for example, which might be functionally associated with forward facing camera 108. In this exemplary implementation, device 100 further includes one or more accelerometers 310, gyroscopic devices, or the like, that may be used for sensing movement of device 100 and provide information about such movement, such as three-dimensional direction, speed, acceleration, etc., to processor(s) 302. In turn, processor(s) 302 may use this motion information in conjunction with processor executable instructions 306 to facilitate navigation of projected image 202 (FIG. 2a) and/or to facilitate other aspects of projection of the projected image, such as the locking of displayed image 202. Further, input from accelerometers 310 may be used to stabilize the anamorphic projection on the projection surface.

In one embodiment, for example, device 100 includes other components such as hardware interface(s) 314 (e.g., a Universal Serial Bus (USB)), a Radio Frequency Identification (RFID) reader 316, wireless communication transceiver 318, and input/output (I/O) devices (e.g., a microphone 320, speaker(s) 322, and a headphone jack 324). Input to microphone 320, for example, might be used by processor(s) 302, employing processor executable instructions from memory 304, for any number of functions in device 100. For example, voice input from the user may be used to provide user input for navigation (e.g., voice recognition could be used for selection and/or to provide input in lieu of a keyboard). In another example, processor(s) 302, employing processor executable instructions 306 from memory 304, might output audio content accompanying anamorphic projection 202. As another example, speaker 322 might provide feedback to the user during navigation of a user interactive anamorphic projection 202 (e.g., selection clicks and the like). In yet another example, headphone jack 324 may be employed by the user (e.g., in lieu of speaker 322), particularly to provide stereo input accompanying an anamorphic projection.

The embodiment of device 100 illustrated in FIGS. 1a, 1b, and 2 is displayless in that illustrated device 100 does not itself have a screen, nor is it connected to a monitor, or the like. Rather, device 100 of FIGS. 1a, 1b, and 2, in effect, employs projector 104 and its projected anamorphic image 202 as its sole display. Embodiments of the present device may, however, employ a display 326 operatively coupled to processor 302. Display 326 might be a LED display, OLED display, or other compact lightweight display well adapted for use in a wireless handheld device. Display 326 may present a user with the same image as being projected by projector 104 or it may present a user another image, such as information about the image being projected, navigation information, device status information, or the like.

Figure 4:
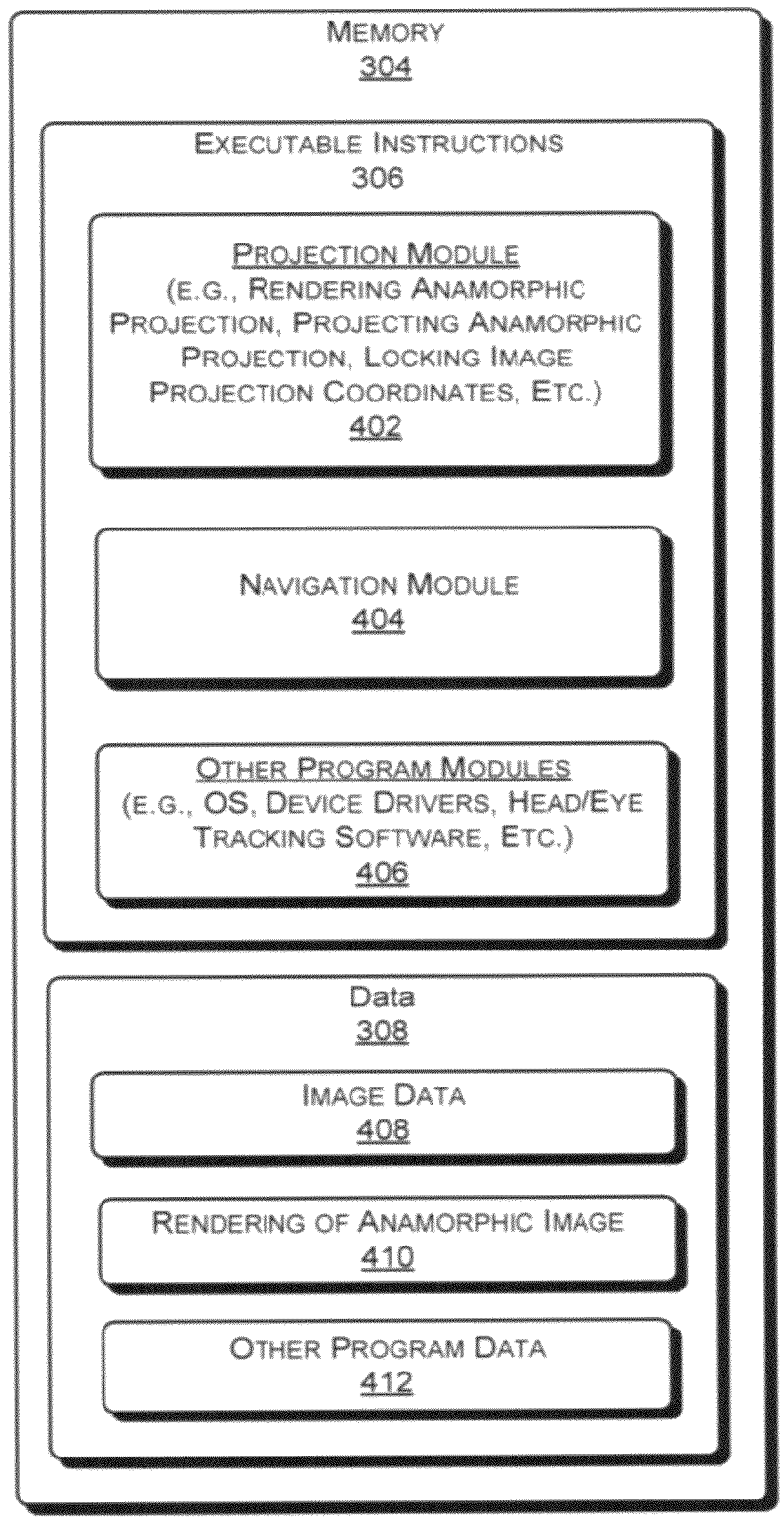
FIG. 4 is a diagrammatic illustration of contents of memory of a device operatively configured to project an anamorphic image onto a projection surface, according to one embodiment.

FIG. 4 is a diagrammatic illustration of contents of memory 304 (FIG. 3) of a device 100 (FIG. 1) operatively configured to project an anamorphic image onto a projection surface 204, according to one embodiment. Processor executable instructions 306 included in memory 304 might include a projection module 402, a navigation module 404, and other program modules 406 such as an operating system (OS), device drivers, and/or so on.

Projection module 402 comprises computer program instructions to anamorphically render, e.g., using perspective anamorphosis, and project an anamorphic projection on a sensed projection surface 204 so as to appear to the user or other intended viewer(s) to have visual depth (FIG. 2a). Such a projection surface is independent of and spaced apart from device 100. Projection module 402 may have default settings for projecting anamorphic projection onto a surface a predetermined distance away, employing a predetermined tilt of the device relative to the projection surface. However, in particular implementations, projection module 402 is operatively configured to direct projector 104 (FIG. 1) to project registration marks 210 (FIG. 2), or the like onto the projection surface. Projection module 402 may cause forward facing sensor/camera 108 (FIG. 1) to sense the position and/or orientation of a number of registration marks 210. The projection of anamorphic projection 202 on the surface may be rendered by projection module 402 based on the position and/or orientation of registration marks 210, relative to device 100. Additionally, in one implementation, information from rearward facing camera 112 concerning the position of the viewer, such as the viewer's head and/or eye position or orientation, with respect to the device, may be used by projection module 402 when rendering and projecting anamorphically-rendered image 202 on projection surface 204. For example, projection module 402 may anamorphically render projection 202 for the position (e.g., the angle) of the viewer (particularly the viewer's head and/or eyes) relative to the position and orientation of projection surface 204. As a further example, as the eye/head position of the viewer(s) changes, the anamorphic image projection may be corrected in view of the detected movement by projection module 402.

In one implementation, the projection module 402 includes computer executable instructions to lock a presented anamorphic projection 202 (FIG. 2) into a stationary coordinate position on a projection surface, relative to device 100. In such implementations, movement of device 100 relative to the locked anamorphically-rendered image results in modification of the image. This modification may take the form of rotation of the anamorphically-rendered image, such that, as the user holding device 100 moves "around" anamorphically-rendered image 102, the projected image changes to provide the user a newly rendered anamorphic view of the image from a differing angle, reflective of the user's changed position.

Navigation module 404 is operatively configured to receive user input (shown as a respective portion of "other program data" 414) to device 100 to navigate a projected user interactive anamorphic projection 202 in accordance with the user input. As used herein, references to "navigate" or "navigation" generally refer to moving about within the projected image, as one would a webpage, menu, or similar interactive image, and/or selection of various links, for movement from one page to another, and/or selection of buttons, boxes, or the like displayed in the image, for further interaction. The user navigation input might be movement of device 100. In this latter scenario, the instructions might provide the aforementioned navigation in accordance with movement of the device relative to a locked anamorphic projection. In one implementation, for example, movement of device 100 might move a cursor within anamorphic projection 202 to allow selection of projected webpage links, a particular photo in a projected photo album, an item in a menu, or the like, in anamorphic projection 202, which may facilitate display of a subsequent user interactive anamorphic projection.

Program data 308, includes, for example, data that is pervasive or transitory. For example, memory 304 may store image data 408, such as photos, videos, etc., and/or memory 304 may act as a cache, storing rendering 410 of anamorphically projected image 202 as data, which may be a webpage, and other program data such as final results, intermediate values, etc.

For purposes of illustration, various components (including program modules) are shown herein as discrete blocks, although it is understood that such components and corresponding independent and distinct logic may be integrated or implemented in more or less or different components or modules. Alternatively, the systems and procedures described herein can be implemented in hardware, or a combination of hardware, software, and/or firmware. For example, one or more Application Specific Integrated Circuits (ASICs) can be programmed to carry out one or more of the systems and procedures described herein.

Exemplary Procedures for Projecting an Anamorphic Projection

FIG. 5 shows an example procedure 500 to render and project an anamorphic image using a device, according to one embodiment. At 502, a device 100 determines a position and orientation of a projection surface (204) independent from the device. This determining may include using default values for the position and orientation of a projection surface, sensing the position and orientation of a projection surface, receiving user input or selected projection surface position and orientation values, or the like. The device anamorphically renders an image at 504, such as through the use of using perspective anamorphosis.

Perspective anamorphosis may be applied to render an anamorphic image for projection through one or more different techniques. For example, in one implementation, the device may render an image at a sharp angle and overlay a grid over the image. Then, based on detected characteristics (e.g., distance and/or orientation, etc.) of the projection surface, the device may render an elongated grid representing the image to be projected. The device then reproduces the contents of the first grid into the second grid on a block by block basis. At block 506, the anamorphically-rendered image is projected from a forward facing projector (106) disposed on the distal end of the device onto the surface. For example, the elongated rendering is projected onto the projection surface as a two-dimensional perspective anamorphic image that will appear in to a viewer of the device to have visual depth. In another implementation, the device may warp an image to achieve a rendering of the image at a sharp angle. Then, using the above discussed techniques, the device generates a two-dimensional perspective anamorphic image for viewing. Regardless, the projected anamorphically-rendered image appears to a viewer to have visual depth, such as shown in FIG. 2a.

Optionally, procedure 500 may afford interaction with an anamorphic image, particularly where the anamorphic image is a user interactive anamorphically-rendered image. For example, at step 508, the device may receive user input to the device, which may take the form of user movement of the device, with respect to the projected image and/or user input to a control, such as haptic human interface 110. In this scenario, at block 510, the projected anamorphically-rendered image may be manipulated by the device 100 in accordance with the user input. This manipulating might include navigating the anamorphically-rendered image, rotating the image, resizing, offsetting to match other points in space (e.g., besides head/eye position, etc.).

FIG. 6 shows an exemplary procedure 600 to project an anamorphic image based on position and orientation of projected registration marks, according to one embodiment, and which may be employed in furtherance of procedure 500 discussed above, or the like. At block 602, the device 100 for anamorphic projection senses a projection surface (such as discussed above with respect to step 502 of procedure 500) and projects registration marks on the sensed surface (e.g., using projector 106). These registration marks may or may not be projected in a spectrum visible to a viewer. Then, at 604, the position and/or orientation of the registration marks are sensed, such as through the use of forward facing camera/sensor 108. At block 606, device 100 renders an anamorphic image, such as discussed with respect to step 504 above, and based on the position and orientation of the registration marks. At block 608, device 100 projects the anamorphic image onto the surface, such as discussed with respect to step 506 above, based on the position and orientation of the registration marks such that the anamorphic projection appears to a viewer to have visual depth.

FIG. 7 shows an exemplary procedure 700 to use a device to project an anamorphic image on a projection surface based on sensed positioned and/or orientation of a user of the device, or other viewer, according to one embodiment. The operations of procedure 700 may be employed in furtherance of procedure 500 discussed above, or the like. At block 702, a device 100 senses a position and orientation of a user or other viewer (e.g., using rearward facing camera 112). At block 704, the device uses a forward facing projector disposed on a distal end of the device to project an anamorphically-rendered image onto a sensed surface. In this particular embodiment, the anamorphically-rendered projection is based on the sensed position and orientation of the viewer relative to the position and orientation of the projection surface (e.g., please see operations of block 502 of procedure 500 in FIG. 5) to provide the viewer with a projected image that has visual depth.

FIG. 8 shows an exemplary procedure 800 to project and interact with an anamorphic image projected by a device, and wherein the image is modified responsive to viewer position, according to one embodiment. At 802, an anamorphically-rendered image, such as an anamorphically-rendered image projected in accordance with procedure 500 described above with respect to FIG. 5, is locked into a stationary position on the projection surface, from the viewer's perspective. That is, this stationary position is stationary relative to the device projecting the image. Movement of the viewer, such as movement of the viewer's head, relative to the projection surface and thus relative to the locked anamorphically-projected image is detected at block 804, such as through the use of rearward facing camera 112. This detected movement at block 804 results in modification of the image, such as by re-rendering the anamorphic image, at 806 such that the projected image continues to appear to have depth to the viewer, as the viewer moves.

FIG. 9 shows an exemplary procedure 900 to render and project an anamorphic image, wherein the anamorphic image is modified responsive to movement of a handheld display less device, according to one embodiment. At block 902 an anamorphically-rendered image, such as an anamorphically-rendered image projected in accordance with procedure 500 above, is locked into a stationary position on a projection surface. The stationary position is stationary relative to the device projecting the image. In this particular embodiment, operations of block 904 detect movement of the device relative to the locked anamorphically-projected image. At block 906, and responsive to detecting movement of the device, the procedure automatically modifies the rendering of the anamorphic image, such that the anamorphic projection is presented to the viewer with an in-perspective correct view (e.g., proper rotation/depth) independent of the movement.

CONCLUSION

Although systems and methods for an anamorphic projection device have been described in language specific to structural features and/or methodological operations or actions, it is understood that the implementations defined in the appended claims are not necessarily limited to the specific features or actions described. Rather, the specific features and operations of the device with an anamorphic projection are disclosed as exemplary forms of implementing the claimed subject matter.

The invention claimed is:

1. A device comprising:
a projector disposed in a distal end of the device from a user;
a projection surface sensor configured to sense registration marks projected on a projection surface, the projection surface independent from the device;
a processor operatively coupled to the sensor and the projector; and
memory operatively coupled to the processor, the memory including processor executable instructions for:
(a) sensing, using the registration marks sensed by the projection surface sensor, the projection surface;
(b) anamorphically rendering image(s) based on position and orientation of the registration marks; and
(c) projecting at least a portion of the image(s) upon the projection surface, the image(s) being projected such that the image(s) has an appearance of visual depth to one or more viewers of the image(s).

2. The device of claim 1, further comprising a rearward facing camera operatively configured to capture characteristics pertaining to a user of the device.

3. The device of claim 1 wherein the device is displayless.

4. The device of claim 1 wherein the at least a portion of the image(s) is a user interactive image(s), and the processor executable instructions further comprise instructions to receive user input to the device and navigate the user interactive image(s) in accordance with the user input.

5. The device of claim 4 wherein the user input comprises movement of the device.

6. The device of claim 1 wherein the sensor comprises a position and orientation component operatively configured to provide the processor executable instructions with position and orientation information corresponding to position and orientation of the projection surface, and wherein the processor executable instructions for projecting at least the portion of the image(s) further comprise instructions for using the orientation information to anamorphically render the image(s) for projection on the projection surface so as to present the image(s) with appearance of visual depth.

7. The device of claim 6 wherein the processor executable instructions further comprise instructions for:
capturing data from the rearward facing camera; and
evaluating the data to determine user position of an operator of the device relative to sensed position and orientation of the projection surface; and
wherein the processor executable instructions for projecting further comprise instructions for projecting the at least a portion of the image(s) upon the projection surface based on the user position.

8. A method at least partially implemented by a projection device, the method comprising:
determining, by the device using registration marks projected on a projection surface, a position and orientation of the projection surface independent from the projection device;
anamorphically rendering, by the projection device, an image to generate an anamorphically-rendered image(s) based on position and orientation of the registration marks; and
projecting the anamorphically-rendered image(s) from a forward facing projector disposed on the distal end of the projection device onto the projection surface, a projection of the anamorphically-rendered image(s) having characteristics of perceived depth.

9. The method of claim 8 wherein the anamorphically-rendered image(s) is/are user interactive image(s) and the manipulating comprises navigating the projection(s).

10. The method of claim 8, further comprising:
locking a projection of the anamorphically-rendered image(s) into a substantially stationary position on the projection surface relative to a viewer(s) of the anamorphically-rendered image(s);
detecting, via a rearward facing camera operatively coupled to the projection device, movement of the viewer(s) relative to the projection; and
responsive to detecting the movement, modifying the anamorphically-rendered image(s) for continued projected appearance of correct viewing perspective and depth to the viewer(s).

11. The method of claim 8, further comprising:
locking a projection of the anamorphically-rendered image(s) into a substantially stationary position on the projection surface relative to the projection device;
detecting movement of the projection device; and
responsive to detecting movement of the projection device, modifying the anamorphically-rendered image(s) for continued projected appearance of correct viewing perspective and depth.

12. The method of claim 8, further comprising sensing a position and orientation of a viewer(s), and wherein the projecting further comprises projecting the anamorphically-rendered image(s) on the projection surface based on the position and orientation of the viewer(s) relative to the position and orientation of the projection surface to provide perceived depth to the viewer(s).

13. The method of claim 12 wherein the sensing the position and orientation of the projection surface further comprises:
projecting a set of registration marks on the projection surface;
detecting position and orientation of the registration marks; and
wherein projecting the anamorphically-rendered image(s) is based on detected position and orientation of the registration marks.

14. The method of claim 8, further comprising:
receiving, by the device, user input to the projection device; and
manipulating, by the projection device, a projection of the anamorphically-rendered image(s) in accordance with the user input.

15. The method of claim 14 wherein operations for receiving the user input further comprise:
detecting movement of the projection device; and
mapping the movement to user commands; and
wherein the user commands are the user input.

16. The method of claim 14 wherein the user input is received via a user interface incorporated into the projection device.

17. A non-transitory computer-readable medium comprising computer program instructions executable by a processor, the computer program instructions when executed by the processor for performing operations in a mobile device, the operations comprising:
determining, using registration marks projected on a projection surface, a position and orientation of the projection surface independent from the projection device;
rendering an anamorphic image based on position and orientation of the registration marks; and
projecting, via a pico projector operatively integrated into the device, at least a portion of the anamorphic image(s) onto the projection surface, the projection surface being separate from and independent of the device.

18. The non-transitory computer-readable medium of claim 17 wherein the operations further comprise:
determining a position and orientation of the projection surface;
locking coordinates of a projection of the anamorphic image(s) on the projection surface to substantially maintain position of the projection independent of device movement; and
providing a user interface to a device user, the user interface allowing the device user to interface with projected user interface controls associated with the projection, present different portions of the projection on the projection surface, and present a new projection of a different anamorphic image rendered in memory of the device.

19. The non-transitory computer-readable medium of claim 17 wherein the operations further comprise operations for receiving anamorphic image over a wireless interface operatively coupled to the device.

* * * * *